(12) United States Patent
Witzani

(10) Patent No.: US 8,169,153 B2
(45) Date of Patent: May 1, 2012

(54) CIRCUIT ARRANGEMENT AND METHOD FOR IGNITING A HIGH-PRESSURE DISCHARGE LAMP

(75) Inventor: Friedrich Witzani, München (DE)

(73) Assignee: OSRAM AG, München (DE)

( * ) Notice: Subject to any disclaimer, the term of this patent is extended or adjusted under 35 U.S.C. 154(b) by 255 days.

(21) Appl. No.: 12/516,693

(22) PCT Filed: Nov. 28, 2006

(86) PCT No.: PCT/EP2006/068973
§ 371 (c)(1),
(2), (4) Date: May 28, 2009

(87) PCT Pub. No.: WO2008/064715
PCT Pub. Date: Jun. 5, 2008

(65) Prior Publication Data
US 2010/0066259 A1  Mar. 18, 2010

(51) Int. Cl.
*H05B 41/16* (2006.01)
*H05B 41/24* (2006.01)
(52) U.S. Cl. ........ 315/261; 315/263; 315/264; 315/109; 315/330
(58) Field of Classification Search .................. None
See application file for complete search history.

(56) References Cited

U.S. PATENT DOCUMENTS

| | | | |
|---|---|---|---|
| 5,729,095 A | 3/1998 | Shimokawa et al. | |
| 6,104,141 A * | 8/2000 | Ganser et al. | 315/209 PZ |
| 6,661,184 B2 * | 12/2003 | Okamoto et al. | 315/289 |
| 2003/0173912 A1 * | 9/2003 | Huber et al. | 315/291 |

FOREIGN PATENT DOCUMENTS

| | | |
|---|---|---|
| CN | 1444429 A | 9/2003 |
| EP | 1 345 478 | 9/2003 |
| EP | 1 633 170 | 3/2006 |
| JP | 04-331474 A | 11/1992 |
| JP | 07-222446 A | 8/1995 |
| JP | 08-096976 A | 4/1996 |
| JP | 2002-008521 A | 1/2002 |
| JP | 2003-297591 A | 10/2003 |
| WO | WO 2006/108407 | 10/2006 |

* cited by examiner

*Primary Examiner* — Anh Tran
(74) *Attorney, Agent, or Firm* — Cozen O'Connor

(57) ABSTRACT

A circuit arrangement for a high-pressure discharge lamp, having a main combustion chamber with first and second main electrodes and an auxiliary combustion chamber including: an inverter having first and second electronic switches and first and second output terminals; a drive circuit for the electronic switches; and an auxiliary starting circuit. The auxiliary starting circuit has input terminals coupled to the output terminals of the inverter; a first output terminal for the first main electrode; a second output terminal for the second main electrode; and an auxiliary electrode arranged on the side of the first output terminal for inducing an auxiliary starting voltage in the auxiliary combustion chamber. The auxiliary starting circuit includes a cascade circuit formed by the auxiliary electrode and the second output terminal of the auxiliary starting circuit, which provides a voltage for starting the high-pressure discharge lamp.

7 Claims, 2 Drawing Sheets

US 8,169,153 B2

CIRCUIT ARRANGEMENT AND METHOD FOR IGNITING A HIGH-PRESSURE DISCHARGE LAMP

RELATED APPLICATIONS

This is a U.S. national stage of application No. PCT/EP2006/068973 filed Nov. 28, 2006.

FIELD OF THE INVENTION

The present invention relates to a circuit arrangement for starting a high-pressure discharge lamp, which has a main combustion chamber with a first and a second main electrode and an auxiliary combustion chamber, with an inverter, which has at least one first and one second electronic switch and one first and one second output terminal, a drive circuit for driving the electronic switches of the inverter, an auxiliary starting circuit, which has a first and a second input terminal, the first input terminal being coupled to the first output terminal of the inverter, and the second input terminal being coupled to the second output terminal of the inverter, a first output terminal for connecting the first main electrode of the high-pressure discharge lamp, a second output terminal for connecting the second main electrode of the high-pressure discharge lamp and an auxiliary electrode for inducing an auxiliary starting voltage in the auxiliary combustion chamber, the auxiliary electrode being arranged on the side of the first output terminal. The invention moreover relates to a method for starting a high-pressure discharge lamp, which has a main combustion chamber with a first and a second main electrode and an auxiliary combustion chamber, using such a circuit arrangement.

BACKGROUND OF THE INVENTION

Such generic circuit arrangements are used, for example, for rear projections in the TV sector. In this case, the high-pressure discharge lamp is operated with a constant square-wave current or else stepped square-wave currents. A typical operating frequency is 100 Hz. In order to start the high-pressure discharge lamp, at present two different variants are used: the first variant is resonance starting, which can be realized with comparatively little complexity but which has the significant disadvantage of a long restarting time of the hot high-pressure discharge lamp of approximately 120 s. In the case of resonance starting, an LC circuit, for example, is brought to resonance and the high voltage resulting from resonance magnification is used for starting purposes. The second known variant is so-called pulse starting, which is characterized by the fact that a component, for example a sidac or a spark discharge gap, is used for the breakdown. This method has a relatively short restarting time of from 10 s to 20 s. Unfortunately, circuit arrangements with pulse starting are characterized by markedly increased implementation complexity, which results in undesirably high costs.

SUMMARY OF THE INVENTION

One object of the present invention is to provide a circuit arrangement and a method that enable the restarting of the still hot high-pressure discharge lamp with as short a restarting time as possible and with operating costs which are as low as possible.

The present invention is based on the knowledge that the above object can be achieved if a resonance starting system is used as a basis which is supplemented by an auxiliary starting circuit, which is designed to generate a polarizing high voltage, which is applied in correct phase sequence for achieving a maximum voltage between the auxiliary electrode and the opposite main electrode of the high-pressure discharge lamp. For this purpose, the auxiliary starting circuit comprises a cascade circuit, which provides a voltage for starting the high-pressure discharge lamp at the output of said circuit, the output of the cascade circuit being formed by the auxiliary electrode and the second output terminal of the auxiliary starting circuit.

This measure means that the auxiliary starting circuit only needs to be designed for very low currents, which ultimately results in a very reliable starting system in combination with short restarting times alongside low costs.

In a preferred embodiment, the starting circuit furthermore comprises a resonant capacitor, which is coupled between the first and the second input terminal of the auxiliary starting circuit, the first terminal of the resonant capacitor being coupled to the first output terminal of the auxiliary starting circuit, and the second terminal of the resonant capacitor being coupled to the second output terminal of the auxiliary starting circuit.

Preferably, the auxiliary starting circuit furthermore comprises a first cascade capacitor, a first cascade diode, and a second cascade diode, the first terminal of the resonant capacitor furthermore being coupled to the auxiliary electrode via the series circuit comprising the first cascade capacitor and the second cascade diode, the node of the first cascade capacitor being coupled to the anode of the second cascade diode and to the cathode of the first cascade diode, and the anode of the first cascade diode being coupled to the second terminal of the resonant capacitor. This provides a starting cascade which generates a high voltage in a targeted manner and applies it to the auxiliary electrode. As a result, an excimer discharge is generated in the auxiliary combustion chamber, which excimer discharge triggers the ignition process in the main combustion chamber.

Given suitable dimensions, the voltage applied to the resonant capacitor can be approximately tripled. Starting from a voltage across the resonant capacitor of approximately 2.5 kV, it is therefore possible to generate a starting voltage of up to 7.5 kV by using the procedure according to an embodiment of the invention. This auxiliary voltage is present between the auxiliary electrode and the opposite main electrode.

Preferably, the auxiliary starting circuit furthermore comprises a nonreactive resistor, which is coupled between the second terminal of the resonant capacitor and the anode of the first cascade diode. As a result, the rate at which the first cascade capacitor is charged can be controlled, as well as the residual voltage which remains during regular operation of the high-pressure discharge lamp. In this case, the resistance of the nonreactive resistor can also approach zero, however.

Preferably, the auxiliary starting circuit furthermore comprises a second cascade capacitor, whose first terminal is coupled to the anode of the first cascade diode, and whose second terminal is coupled to the auxiliary electrode. As a result, the system-related capacitance between the auxiliary electrode and the opposite main electrode can be increased. This reduces the ripple of the voltage and shortens the restarting time.

In a preferred embodiment, the auxiliary starting circuit furthermore comprises a matching network, which is coupled between the first and the second input terminal of the auxiliary starting circuit and the first and the second terminal of the resonant capacitor. Preferably, the matching network in this case comprises at least one inductance, in particular a first and a second inductance, the first inductance being coupled in series between the first input terminal of the auxiliary starting circuit and the first terminal of the resonant capacitor, and the second inductance being coupled in series between the second input terminal of the auxiliary starting circuit and the second terminal of the resonant capacitor. The at least one inductance forms, together with the resonant capacitor, the resonant circuit, which is the basis for the present auxiliary starting circuit. As a result, the fixed output voltage pattern of the inverter can moreover be converted in a simple way with very low losses into the current which is required by the high-pressure discharge lamp during operation. At the same time, the high-pressure discharge lamp is provided with the required freedom for setting its dedicated voltage, which is produced given the current provided at that time. Moreover, the at least one inductance acts as a return filter, which damps the disruptive influences of the high-pressure discharge lamp on the inverter and which at the same time positively influences the switchover operations of the inverter itself.

If the first cascade capacitor, the first cascade diode and the second cascade diode form a first cascade stage, it can furthermore preferably be provided that the auxiliary starting circuit comprises at least one second cascade stage, which is coupled between the first cascade stage and the first output terminal, the second output terminal and the auxiliary electrode of the starting circuit. Arranging a plurality of cascade stages in series makes it possible to set the voltage provided at the output of the auxiliary starting circuit to be as high as desired.

The preferred embodiments mentioned with reference to the circuit arrangement according to the invention and the advantages thereof apply, if appropriate, correspondingly to the method according to the invention.

BRIEF DESCRIPTION OF THE DRAWING(S)

Exemplary embodiments of a circuit arrangement according to the invention will now be described in more detail below with reference to the attached drawings, in which.

PREFERRED EMBODIMENT OF THE INVENTION

Figure 1:
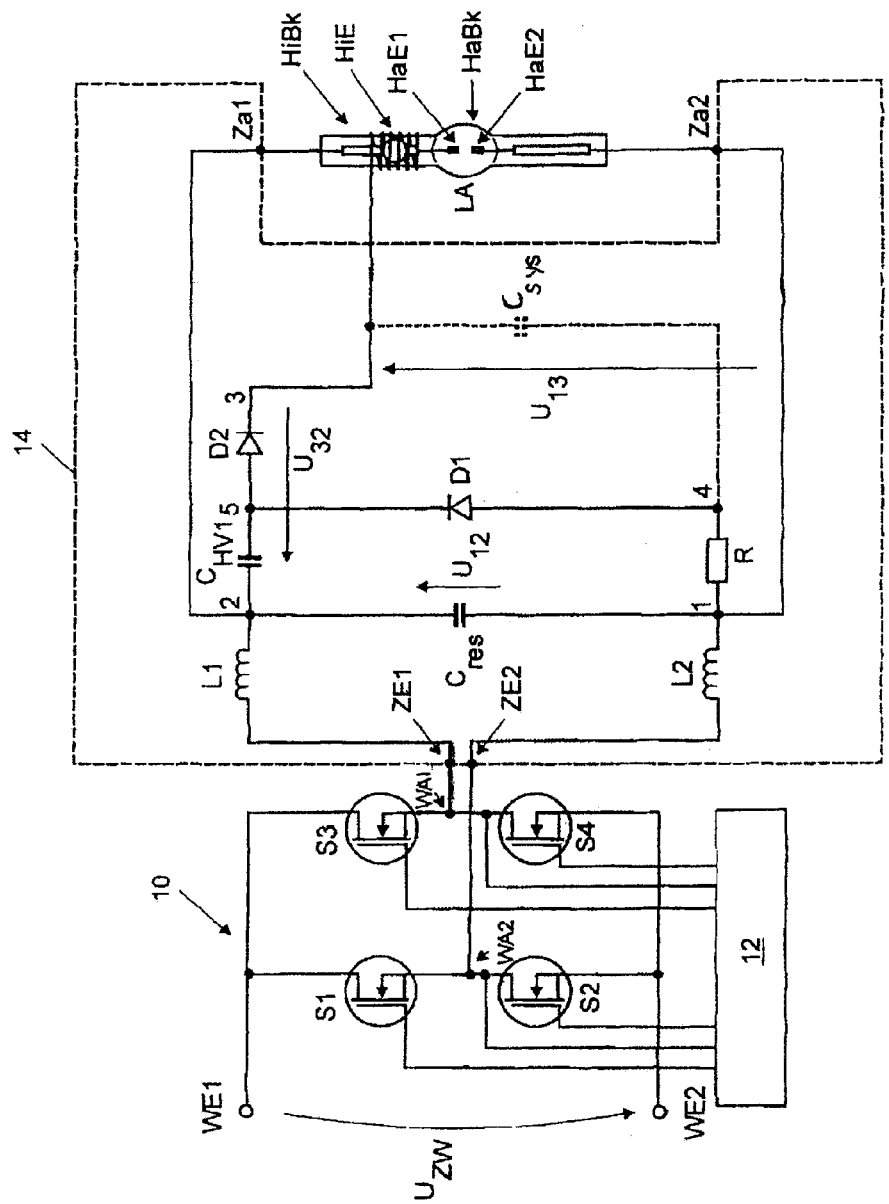
FIG. 1 shows a schematic illustration of the design of a circuit arrangement according to the invention.

FIG. 1 shows a schematic illustration of the design of an exemplary embodiment of a circuit arrangement according to the invention. It shows an inverter 10, with a DC voltage, generally the so-called intermediate circuit voltage $U_{ZW}$, present at the input terminals WE1, WE2 of said inverter. These switches S1 to S4 of the inverter 10 are driven in a known manner by a control apparatus 12 in order to generate a square-wave signal between the output terminals WA1, WA2 of the inverter 10. In a preferred exemplary embodiment, the sequence of the square-wave signal is between 30 kHz and 100 kHz. As is obvious to a person skilled in the art, the inverter 10 can also be implemented as a half-bridge circuit, instead of as a full-bridge circuit.

The output terminal WA1 of the inverter 10 is connected to an input terminal ZE1, and the output terminal WA2 of the inverter 10 is connected to an input terminal ZE2 of an auxiliary starting circuit 14. The auxiliary starting circuit 14 first has a matching network, which comprises the inductances L1 and L2. These form, together with a resonant capacitor $C_{RES}$, a resonant circuit. In this case, the inductances L1 and L2 may be two independent components; they can have the same value, but do not have to, wherein it is possible in particular for one of the two inductances to approach zero. They can particularly preferably also be implemented by a combined component, in which two windings are applied to one and the same magnetic core. In this case, the node between the inductance L1 and the resonant capacitor $C_{res}$ is denoted by the node 2, and the node between the inductance L2 and the resonant capacitor $C_{res}$ is denoted as the node 1. The node 2 forms a first output terminal ZA1 of the auxiliary starting circuit 14, and the node 1 forms an output ZA2 of the auxiliary starting circuit 14. The auxiliary starting circuit 14 moreover has an auxiliary electrode HiE, which is arranged over an auxiliary combustion chamber of the high-pressure discharge lamp LA and has a helical formation. The output terminal ZA1 of the auxiliary starting circuit 14 is connected to a first main electrode HaE1, and the output terminal ZA2 is connected to a second main electrode HaE2 of the high-pressure discharge lamp LA, with the result that the first and the second main electrode HaE1, HaE2 are introduced into the main combustion chamber HaBk thereof. The series circuit comprising a first cascade capacitor $C_{HV1}$ and a second cascade diode D2 is arranged between the node 2 and the auxiliary electrode HiE, with the cathode of the cascade diode D2 being denoted as the node 3, and the node between the first cascade capacitor $C_{HV1}$ and the second cascade diode D2 being denoted as the node 5. The series circuit comprising a nonreactive resistor R and a first cascade diode D1 is arranged between the node 1 and the node 5, the node between the nonreactive resistor R and the anode of the cascade diode D1 being denoted as the node 4. Optionally, a second cascade capacitor $C_{sys}$ can be arranged between the node 4 and the node 3. As is indicated in FIG. 1, the voltage drop across the resonant capacitor $C_{res}$, i.e. the voltage drop between the nodes 1 and 2, is denoted as the voltage $U_{12}$. The voltage drop between the node 1 and the cathode of the second cascade diode D2, i.e. between the nodes 1 and 3, is denoted as the voltage $U_{13}$. If the voltage between the nodes 3 and 2 is denoted as $U_{32}$, the voltage $U_{13}$ therefore results in accordance with the following equation:

$$U_{13}=U_{12}-U_{32}.$$

The determination of the voltage $U_{13}$ in this way is necessary since the voltage $U_{13}$ is very highly resistive and therefore is difficult to measure, in contrast to the voltages $U_{12}$ and $U_{32}$.

Figure 2:
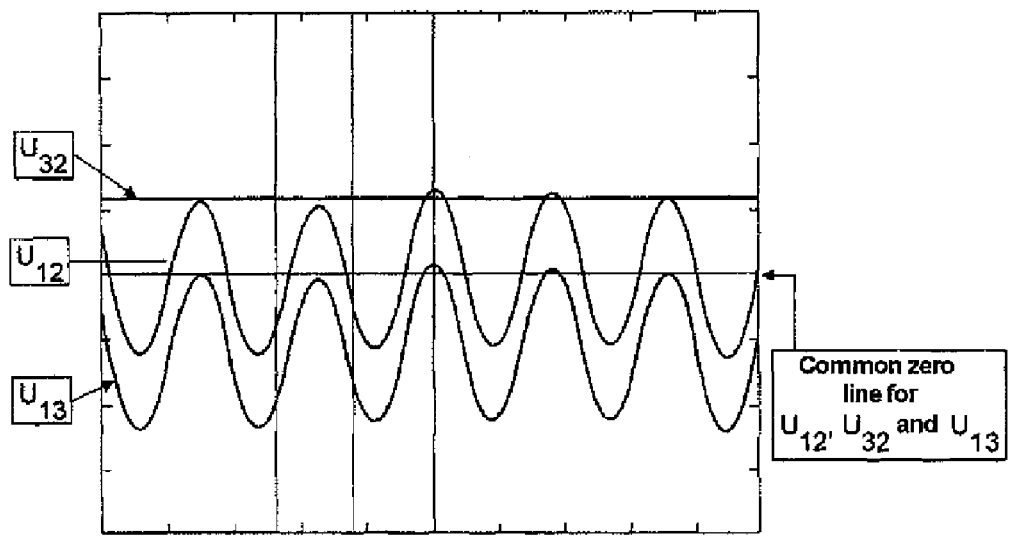
FIG. 2 shows the time profile of three variables from FIG. 1, with the second cascade diode being replaced by a short circuit.
Figure 3:
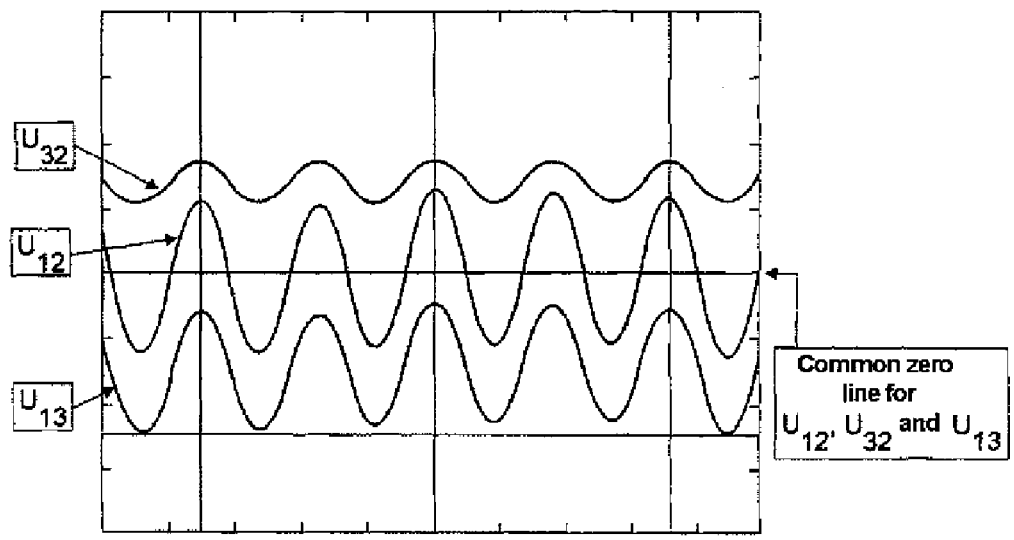
FIG. 3 shows the time profile of the variables from FIG. 2 with the second cascade diode inserted.

In order to describe the way in which the circuit functions, reference is furthermore made to FIGS. 2 and 3, where FIG. 2 shows the time profile of the voltages $U_{12}$, $U_{32}$ and $U_{13}$ if the second cascade diode D2 is replaced by a short circuit and FIG. 3 shows the corresponding profile with the second cascade diode D2 inserted. It should furthermore be noted that the common zero line for the voltages $U_{12}$, $U_{32}$ and $U_{13}$ is the correspondingly identified central line in the graph illustrated in FIGS. 2 and 3.

The voltage $U_{12}$ is produced across the resonant capacitor $C_{res}$ via the series resonant circuit, which comprises the inductances L1 and L2 and the resonant capacitor $C_{res}$. In this regard, the following should be noted: by operating the full-bridge circuit at a third, a fifth or a seventh of the resonant frequency, which is defined by the components L1, L2 and $C_{res}$, the full-bridge circuit is switched over precisely at the zero crossing of the resonant voltage formed. These switchover times are shown in FIGS. 2 and 3 by virtue of the fact that the resultant resonant voltages assume a positive or negative maximum. In between these times, no energy is supplied to the resonant circuit and the voltages decay in accordance with an exponential function. As a result of this stimulation by means of a square-wave voltage, the resonant voltage across the resonant capacitor $C_{res}$ is formed as a sinusoidal voltage.

The voltage $U_{12}$ is a sinusoidal AC voltage without a DC component. By means of this voltage, the first cascade capacitor $C_{HV1}$ is charged via the nonreactive resistor R, which acts as the charging resistor, and the first cascade diode D1 if the node 1 has a positive polarity in relation to the node 2. Without the presence of the diode D2, i.e. the nodes 5 and 3 are connected by a short circuit, the first cascade capacitor $C_{HV1}$ has a substantially constant charge, i.e. the voltage $U_{32}$ is a DC voltage whose amplitude virtually does not change; see in this regard the illustration in FIG. 2. The voltage $U_{13}$ results by the difference being formed between the voltage $U_{12}$ and the voltage $U_{32}$. In FIG. 2, the voltage $U_{13}$ is therefore lower than the voltage $U_{12}$ by the absolute value of $U_{32}$. This voltage is present between the second main electrode HaE2 and the auxiliary electrode HiE and assists the starting by generation of an excimer discharge in the auxiliary combustion chamber HiBk.

As is demonstrated by a comparison of the time profile of the voltage $U_{32}$ in FIG. 3 and of the voltage $U_{32}$ in FIG. 2, inserting a second cascade diode D2 makes it possible to achieve a situation in which the voltage $U_{32}$ likewise has a sinusoidal profile, with the smallest amplitude corresponding to the voltage $U_{32}$ in FIG. 2. This means that the time profile of the voltage $U_{13}$ now no longer falls to zero, but forms a markedly leading mean value. As a result, the production of an excimer discharge in the auxiliary combustion chamber is favored considerably, as a result of which it is possible for the restarting time to be shortened in comparison with circuit arrangements without an auxiliary starting circuit according to the invention by up to 50%.

In relation to the difference between FIGS. 2 and 3: first in relation to FIG. 2, i.e. the variant without the second cascade diode: if a positive half cycle is present across the first cascade diode D1, the first cascade capacitor $C_{HV1}$ is thereby charged. If a negative half cycle is present across the first cascade diode D1, the second cascade capacitor $C_{sys}$ is thereby charged. Without the second cascade diode D2, however, the capacitor $C_{sys}$ is discharged again on the next positive half cycle across the first cascade diode D1. As a result, $U_{12}$ becomes equal to $U_{32}$, as a result of which the voltage $U_{13}$ has zero points. A second cascade diode D2 prevents the discharge of the second cascade capacitor C. This prevents $U_{12}$ from becoming equal to $U_{32}$, as a result of which $U_{13}$ now no longer has any zero points.

Instead of providing a discrete second capacitor $C_{sys}$, said capacitor can also be dispensed with since this capacitance is in any case provided in a system-dependent manner between the auxiliary electrode HiE and the main electrodes HaE1, HaE2.

Once the lamp LA has been restarted, the resonant circuit is suddenly heavily damped. This circumstance is identified by the controller 12 of the inverter 10, whereupon the high-pressure discharge lamp is now operated with its continuous operation parameters.

The fact that a considerable improvement over simple resonance starting already results with the implementation without the second cascade diode D2, is demonstrated by a comparison of the voltages $U_{12}$ and $U_{13}$ in FIGS. 2 and 3.

The invention claimed is:

1. A circuit arrangement for starting a high-pressure discharge lamp having a main combustion chamber with a first and a second main electrode and an auxiliary combustion chamber, comprising:
   an inverter, which has at least one first and one second electronic switch and one first and one second output terminal;
   a drive circuit for driving the electronic switches of the inverter; and
   an auxiliary starting circuit comprising:
      a first and a second input terminal, the first input terminal being coupled to the first output terminal of the inverter, and the second input terminal being coupled to the second output terminal of the inverter;
      a first output terminal for connecting the first main electrode of the high-pressure discharge lamp;
      a second output terminal for connecting the second main electrode of the high-pressure discharge lamp;
      an auxiliary electrode for inducing an auxiliary starting voltage in the auxiliary combustion chamber, the auxiliary electrode being arranged on the side of the first output terminal;
      a cascade circuit, which provides a voltage for starting the high-pressure discharge lamp at the output of said circuit, the output of the cascade circuit being formed by the auxiliary electrode and the second output terminal of the auxiliary starting circuit;
      a resonant capacitor, which is coupled between the first and the second input terminal of the auxiliary starting circuit, a first terminal of the resonant capacitor being coupled to the first output terminal of the auxiliary starting circuit, and a second terminal of the resonant capacitor being coupled to the second output terminal of the auxiliary starting circuit;
      a first cascade capacitor;
      a first cascade diode; and
      a second cascade diode, the first terminal of the resonant capacitor being coupled to the auxiliary electrode via a series circuit comprising the first cascade capacitor and the second cascade diode;
      a node of the first cascade capacitor being coupled to an anode of the second cascade diode and to a cathode of the first cascade diode; and
      an anode of the first cascade diode being coupled to the second terminal of the resonant capacitor.

2. The circuit arrangement as claimed in claim 1, wherein the auxiliary starting circuit further comprises a nonreactive resistor, which is coupled between the second terminal of the resonant capacitor and the anode of the first cascade diode.

3. The circuit arrangement as claimed in claim 1, wherein the auxiliary starting circuit further comprises a second cascade capacitor with a first terminal that is coupled to the anode of the first cascade diode and with a second terminal that is coupled to the auxiliary electrode.

4. A circuit arrangement for starting a high-pressure discharge lamp having a main combustion chamber with a first and a second main electrode and an auxiliary combustion chamber, comprising:
   an inverter, which has at least one first and one second electronic switch and one first and one second output terminal;
   a drive circuit for driving the electronic switches of the inverter; and an auxiliary starting circuit comprising:
- a first and a second input terminal, the first input terminal being coupled to the first output terminal of the inverter, and the second input terminal being coupled to the second output terminal of the inverter;
- a first output terminal for connecting the first main electrode of the high-pressure discharge lamp;
- a second output terminal for connecting the second main electrode of the high-pressure discharge lamp;
- an auxiliary electrode for inducing an auxiliary starting voltage in the auxiliary combustion chamber, the auxiliary electrode being arranged on the side of the first output terminal;
- a cascade circuit, which provides a voltage for starting the high-pressure discharge lamp at the output of said circuit, the output of the cascade circuit being formed by the auxiliary electrode and the second output terminal of the auxiliary starting circuit; and
- a matching network, which is coupled between the first and the second input terminal of the auxiliary starting circuit and the first and the second terminal of the resonant capacitor, wherein the matching network comprises a first and a second inductance, the first inductance being coupled in series between the first input terminal of the auxiliary starting circuit and the first terminal of the resonant capacitor, and the second inductance being coupled in series between the second input terminal of the auxiliary starting circuit and the second terminal of the resonant capacitor.

5. The circuit arrangement as claimed in claim 1, wherein at least the first cascade capacitor, the first cascade diode and the second cascade diode form a first cascade stage, the auxiliary starting circuit comprising at least one second cascade stage, which is coupled between the first cascade stage and the first output terminal, the second output terminal and the auxiliary electrode of the auxiliary starting circuit.

6. A method for starting a high-pressure discharge lamp, which has a main combustion chamber with a first and a second main electrode and an auxiliary combustion chamber, using a circuit arrangement with an inverter, which has at least one first and one second electronic switch and one first and one second output terminal, a drive circuit for driving the electronic switches of the inverter, an auxiliary starting circuit comprising a first and a second input terminal, the first input terminal being coupled to the first output terminal of the inverter, and the second input terminal being coupled to the second output terminal of the inverter, a first output terminal for connecting the first main electrode of the high-pressure discharge lamp, a second output terminal for connecting the second main electrode of the high-pressure discharge lamp, and an auxiliary electrode for inducing an auxiliary starting voltage in the auxiliary combustion chamber, the auxiliary electrode being arranged on the side of the first output terminal; an auxiliary electrode for inducing an auxiliary starting voltage in the auxiliary combustion chamber, the auxiliary electrode being arranged on the side of the first output terminal; a cascade circuit, which provides a voltage for starting the high-pressure discharge lamp at the output of said circuit, the output of the cascade circuit being formed by the auxiliary electrode and the second output terminal of the auxiliary starting circuit; a resonant capacitor, which is coupled between the first and the second input terminal of the auxiliary starting circuit, a first terminal of the resonant capacitor being coupled to the first output terminal of the auxiliary starting circuit, and a second terminal of the resonant capacitor being coupled to the second output terminal of the auxiliary starting circuit; a first cascade capacitor; a first cascade diode; and a second cascade diode, the first terminal of the resonant capacitor being coupled to the auxiliary electrode via a series circuit comprising the first cascade capacitor and the second cascade diode; a node of the first cascade capacitor being coupled to an anode of the second cascade diode and to a cathode of the first cascade diode; and an anode of the first cascade diode being coupled to the second terminal of the resonant capacitor, wherein the method comprises:
a) generating a voltage for starting the high-pressure discharge lamp by a cascade circuit, which is comprised by the auxiliary starting circuit; and
b) providing the voltage for starting the high-pressure discharge lamp between the auxiliary electrode and the second output terminal of the auxiliary starting circuit.

7. A method for starting a high-pressure discharge lamp, which has a main combustion chamber with a first and a second main electrode and an auxiliary combustion chamber, using a circuit arrangement with an inverter, which has at least one first and one second electronic switch and one first and one second output terminal;
- a drive circuit for driving the electronic switches of the inverter; and
- an auxiliary starting circuit comprising:
  - a first and a second input terminal, the first input terminal being coupled to the first output terminal of the inverter, and the second input terminal being coupled to the second output terminal of the inverter;
  - a first output terminal for connecting the first main electrode of the high-pressure discharge lamp;
  - a second output terminal for connecting the second main electrode of the high-pressure discharge lamp;
  - an auxiliary electrode for inducing an auxiliary starting voltage in the auxiliary combustion chamber, the auxiliary electrode being arranged on the side of the first output terminal; and
- a cascade circuit, which provides a voltage for starting the high-pressure discharge lamp at the output of said circuit, the output of the cascade circuit being formed by the auxiliary electrode and the second output terminal of the auxiliary starting circuit; and
- a matching network, which is coupled between the first and the second input terminal of the auxiliary starting circuit and the first and the second terminal of the resonant capacitor, wherein the matching network comprises a first and a second inductance, the first inductance being coupled in series between the first input terminal of the auxiliary starting circuit and the first terminal of the resonant capacitor, and the second inductance being coupled in series between the second input terminal of the auxiliary starting circuit and the second terminal of the resonant capacitor, wherein the method comprises:
a) generating a voltage for starting the high-pressure discharge lamp by a cascade circuit, which is comprised by the auxiliary starting circuit; and
b) providing the voltage for starting the high-pressure discharge lamp between the auxiliary electrode and the second output terminal of the auxiliary starting circuit.

* * * * *